United States Patent
Ming et al.

(10) Patent No.: US 12,154,554 B2
(45) Date of Patent: Nov. 26, 2024

(54) MAN-MACHINE DIALOGUE METHOD AND APPARATUS, ELECTRONIC DEVICE AND STORAGE MEDIUM

(71) Applicants: Beijing Xiaomi Mobile Software Co., Ltd., Beijing (CN); Beijing Xiaomi Pinecone Electronics Co., Ltd., Beijing (CN)

(72) Inventors: Zhennan Ming, Beijing (CN); Junjie Jiang, Bejing (CN)

(73) Assignees: Beijing Xiaomi Mobile Software Co., Ltd., Beijing (CN); Beijing Xiaomi Pinecone Electronics Co., Ltd., Beijing (CN)

( * ) Notice: Subject to any disclaimer, the term of this patent is extended or adjusted under 35 U.S.C. 154(b) by 247 days.

(21) Appl. No.: 17/681,278

(22) Filed: Feb. 25, 2022

(65) Prior Publication Data
US 2023/0034634 A1 Feb. 2, 2023

(30) Foreign Application Priority Data
Jul. 30, 2021 (CN) .......................... 202110875401.1

(51) Int. Cl.
*G10L 15/22* (2006.01)
*G10L 13/02* (2013.01)
(Continued)

(52) U.S. Cl.
CPC .......... *G10L 15/1815* (2013.01); *G10L 13/02* (2013.01); *G10L 15/22* (2013.01); *G10L 2015/088* (2013.01); *G10L 15/30* (2013.01)

(58) Field of Classification Search
CPC ..... G10L 15/1815; G10L 13/02; G10L 15/22; G10L 15/30; G10L 2015/088;
(Continued)

(56) References Cited

U.S. PATENT DOCUMENTS

| 5,357,596 A | * | 10/1994 | Takebayashi | ............. | G06F 3/16 |
| | | | | | 704/E15.045 |
| 5,758,322 A | * | 5/1998 | Rongley | .................. | G07C 9/37 |
| | | | | | 704/E15.044 |

(Continued)

FOREIGN PATENT DOCUMENTS

| CN | 106055547 A | 10/2016 |
| CN | 108510355 A | 9/2018 |

(Continued)

OTHER PUBLICATIONS

Wang Jiancheng, Xu Yang, Liu Qiyuan, Wu Liangqing, Li Shoushan, "Dialog Sentiment Analysis with Neural TopicModel", Jan. 5, 2020.

(Continued)

*Primary Examiner* — Abul K Azad
(74) *Attorney, Agent, or Firm* — Volpe Koenig

(57) ABSTRACT

A man-machine dialogue method, includes: for each round of a plurality of rounds of dialogue wherein each round includes dialogue information input by a user, determining semantic information corresponding to the dialogue information; determining a target slot position corresponding to an item indicated by the semantic information, establishing a new pre-order data structure including the target slot position when there is no established pre-order data structure including the target slot position; outputting reply information responsive to the dialogue information, wherein the reply information is configured to guide the user to input new dialogue information in a subsequent round of dialogue; and in a case that the dialogue information input by the user in the subsequent round includes a keyword for indicating ordering, performing an ordering operation according to a finally-established pre-order data structure.

15 Claims, 5 Drawing Sheets

(51) Int. Cl.
 *G10L 15/18* (2013.01)
 *G10L 15/08* (2006.01)
 *G10L 15/30* (2013.01)

(58) Field of Classification Search
 CPC .............. G06F 16/3329; G06F 16/243; G06F 16/3343; G06F 16/3344; G06F 40/30; G06Q 30/016; G06Q 30/0601; G06Q 30/0635
 USPC ........................................................ 704/275
 See application file for complete search history.

(56) References Cited

U.S. PATENT DOCUMENTS

| | | | | |
|---|---|---|---|---|
| 6,044,347 | A | * | 3/2000 | Abella .................... G10L 15/22 704/E15.04 |
| 6,233,561 | B1 | * | 5/2001 | Junqua ................ G10L 15/1822 704/277 |
| 6,246,981 | B1 | * | 6/2001 | Papineni ................ G10L 15/22 704/E15.04 |
| 6,510,411 | B1 | * | 1/2003 | Norton ................ H04M 3/4936 704/E15.045 |
| 10,885,906 | B2 | * | 1/2021 | Steedman Henderson .................. G06F 40/35 |
| 2004/0068443 | A1 | | 4/2004 | Hopson et al. |
| 2018/0052885 | A1 | | 2/2018 | Gaskill et al. |
| 2018/0307745 | A1 | | 10/2018 | Bachrach et al. |

FOREIGN PATENT DOCUMENTS

| | | |
|---|---|---|
| CN | 109493166 A | 3/2019 |
| CN | 110008319 A | 7/2019 |
| CN | 111242721 A | 6/2020 |
| CN | 111368548 A | 7/2020 |
| CN | 111427992 A | 7/2020 |
| CN | 111428483 A | 7/2020 |
| CN | 112100349 A | 12/2020 |
| JP | 2006053470 A | 2/2006 |
| KR | 20000072454 A | 12/2000 |
| WO | 2020/141883 A2 | 7/2020 |

OTHER PUBLICATIONS

Chinese Office Action issued on Dec. 18, 2023 for Chinese Patent Application No. 2021108754011.

Chen, T., et al., "Improving Long Distance Slot Carryover in Spoken Dialogue Systems. In Proceedings of the First Workshop on NLP for Conversational AI", Association for Computational Linguistics, Italy, (2019).

Huang Y., et al., "Architecture and Algorithms of Intelligent Dialogue System". Journal of Beijing University of Posts and Telecommunications, (2019).

* cited by examiner

MAN-MACHINE DIALOGUE METHOD AND APPARATUS, ELECTRONIC DEVICE AND STORAGE MEDIUM

CROSS REFERENCE TO RELATED APPLICATION

The disclosure claims the benefit of priority to Chinese Application No. 2021108754011, filed on Jul. 30, 2021, the contents of which are incorporated herein by reference in their entirety.

BACKGROUND

In daily life, online shopping has become normal. During online shopping, some shopping needs of a user may be known through a man-machine dialogue mode.

SUMMARY

The disclosure relates to the field of computers, in particular to a man-machine dialogue method and apparatus, an electronic device and a storage medium. In order to solve the problem existing in the related technology, the disclosure provides a man-machine dialogue method and apparatus, an electronic device and a storage medium.

According to a first aspect of an example of the disclosure, a man-machine dialogue method is provided, including:

in each successive, respective round of a plurality of rounds of dialogue in which dialogue information is input by a user in each round, determining semantic information corresponding to the input dialogue information;

determining a target slot position corresponding to an item indicated by the corresponding semantic information, wherein the item is indicated by a commodity name and/or a commodity attribute;

establishing a new pre-order data structure including the target slot position when there is no existing pre-order data structure including the target slot position, where in the pre-order data structure includes at least one slot position and at least one item that is configurable during issuing of a commodity corresponding to the at least one slot position;

outputting reply information responsive to the dialogue information, wherein the reply information is configured to guide the user to input new dialogue information in a succeeding round; and in a case that the new dialogue information input by the user includes a keyword indicating ordering, performing an ordering operation according to a finally-established pre-order data structure.

According to a second aspect of an example of the disclosure, a non-transitory computer readable storage medium is provided, storing a computer program comprising processor-executable instructions. The processor-executable instructions, when executed by a processor, implements the man-machine dialogue method provided by the first aspect of the disclosure.

According to a third aspect of an example of the disclosure, an electronic device is provided, including a memory, storing a computer program comprising processor-executable instructions; and a processor, configured to execute the processor-executable instructions in the memory, so as to implement the man-machine dialogue method mentioned in the first aspect of the disclosure.

It should be understood that the above general descriptions and the following detailed descriptions are exemplary and explanatory only, and are not intended to limit the disclosure.

BRIEF DESCRIPTION OF THE DRAWINGS

The accompanying drawings, which are incorporated in and constitute a part of this specification, illustrate examples consistent with the disclosure and together with the specification serve to explain the principles of the disclosure.

DETAILED DESCRIPTION

Figure 1:
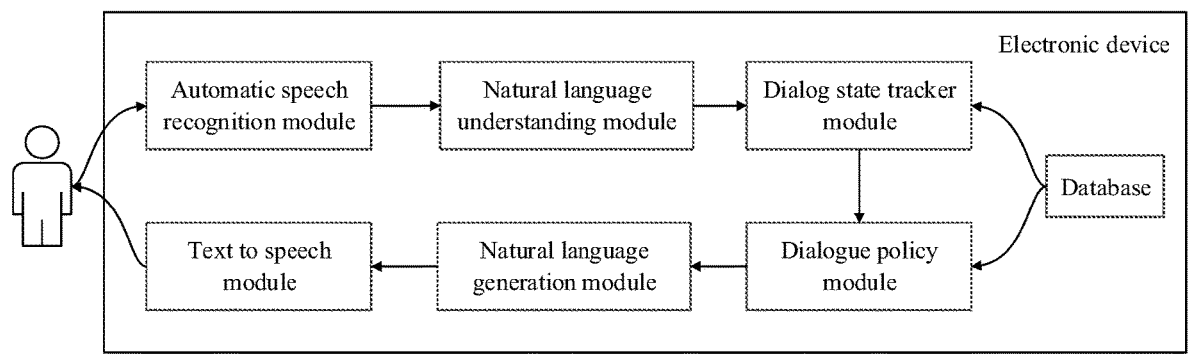
FIG. 1 is a schematic diagram of a system architecture shown according to an example of the disclosure.

Examples will be described in detail herein. The examples are illustrated in the accompanying drawings. When the following description refers to the accompanying drawings, the same numbers in different accompanying drawing figures represent the same or similar elements unless otherwise indicated. The implementations described in the following examples do not represent all possible implementations consistent with the disclosure. On the contrary, they are merely examples of an apparatus and a method consistent with some aspects of the disclosure as detailed in the appended claims.

Before introducing a man-machine dialogue method provided by the disclosure, application scenarios related to each example in the disclosure are illustrated firstly. The disclosure may be applied to a process of performing man-machine dialogue with a user through an electronic device, so as to achieve shopping and ordering.

It should be understood that when the user wants to go shopping on line, such as take-out ordering and online shopping for clothes, the user usually needs to state the desired shopping items. In this case, the user may engage in a man-machine dialogue with the electronic device, and through a man-machine dialogue process, the electronic device may understand the shopping need of the user, so as to perform shopping and ordering of needed items. For example, the shopping needs of the user are determined through a process that comprises one or more rounds of dialogue between a machine and a human so as to result in an order.

However, a study found that in man-machine dialogues in the related technology, one dialogue process (a process of finally achieving one-time ordering operation through one or more rounds of dialogue) can determine a shopping need of the user for no more than one commodity at a time. If the user is shopping for various commodities, a plurality of dialogue processes need to be performed, one for each commodity. The man-machine dialogue mode in the related technology results in a low online shopping efficiency.

In order to solve the above problem, a man-machine dialogue method and apparatus, an electronic device and a storage medium in the example of the disclosure are proposed. When a user is shopping for various needed commodities, the various needed commodities are managed by modifying a pre-order data structure. Moreover, in a case that a subsequent round of dialogue includes information input by the user, and the input information includes a keyword indicating ordering, an ordering operation is performed according to a finally established pre-order data structure, wherein an operation of managing the various commodities and ordering the various commodities in a single dialogue process may be achieved, so that when the user has a purchase need for the various commodities, the user does not need to perform a dialogue process and an ordering operation for each commodity, thus the disclosure improves online shopping efficiency.

It should be noted that the man-machine dialogue in the examples of the disclosure may comprise spoken words (i.e., speech dialogue) or text dialogue.

In a speech dialogue scenario, the user may speak, thereby inputting vocalized speech, i.e., spoken information, e.g., by speaking into the electronic device in one or more rounds of a plurality of rounds of dialogue. The electronic device may utilize the man-machine dialogue method of the example of the disclosure to process the spoken information obtained in the one or more rounds of the plurality of rounds of spoken dialogue, so as to finally achieve shopping and ordering.

In a text dialogue scenario, the user may participate in one or more rounds of dialogue by inputting information in text form, for example the user may participate in a plurality of rounds of dialogue by inputting text information to a man-machine interaction interface of a client side of the electronic device. The electronic device may utilize the man-machine dialogue method of the example of the disclosure to process the text information received in one or more rounds of a plurality of rounds of dialogue, so as to finalize the shopping and ordering.

Before the technical solution of the example of the disclosure is illustrated in detail, a system architecture related to the electronic device applied by the example of the disclosure is described and illustrated.

As shown in FIG. 1, in some cases, when a man-machine dialogue is a spoken dialogue, the system architecture may include an Automatic Speech Recognition (ASR) module, a Natural Language Understanding (NLU) module, a Dialog State Tracker (DST) module, a Dialogue Policy (POL) module, a Natural Language Generation (NLG) module, a Text To Speech (TTS) module, and a database.

The automatic speech recognition module is configured to perform speech recognition on speech information so as to obtain dialogue information.

The natural language understanding module may use an NLU module based on a logistic regression (LR) module to recognize intent of the user, and performs semantic recognition on each round of input dialogue information based on an XGBoost multi-classification, so as to obtain semantic information corresponding to the dialogue information.

The dialog state tracker module is configured to determine a target slot position corresponding to an item included by the semantic information, and newly establish a pre-order data structure including the target slot position when there is no pre-order data structure including the target slot position before this round of dialogue.

The dialogue policy module is configured to output reply information as for the dialogue information.

The natural language generation module reads an NLG rule template to generate a natural language verbal trick, namely, the reply information.

The text to speech module is configured to perform text to speech conversion on the reply information, so as to obtain reply information conveyed by speech.

The database is configured to store configuration information, a merchant commodity name slot position set and the like.

Figure 2:
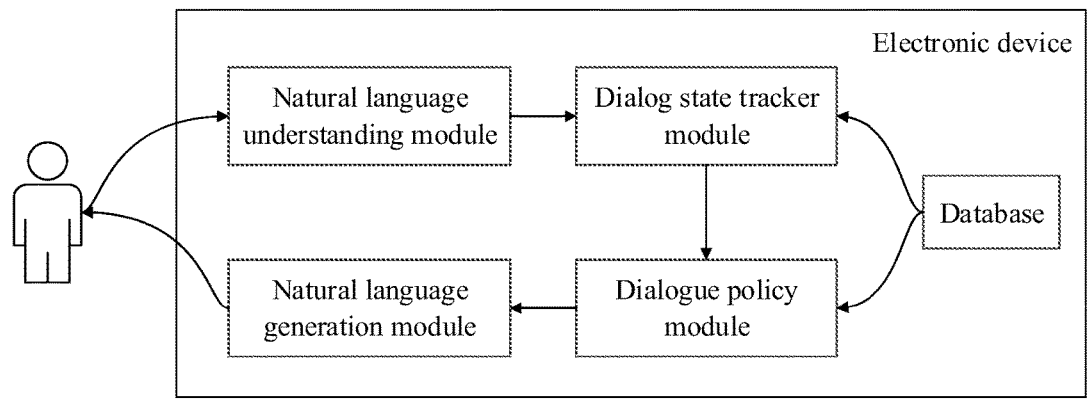
FIG. 2 is a schematic diagram of another system architecture shown according to an example of the disclosure.

As shown in FIG. 2, in some other cases, when the man-machine dialogue is a text dialogue, the system architecture may also include the natural language understanding module, the dialog state tracker module, the dialogue policy module, the natural language generation module and the database.

Figure 3:
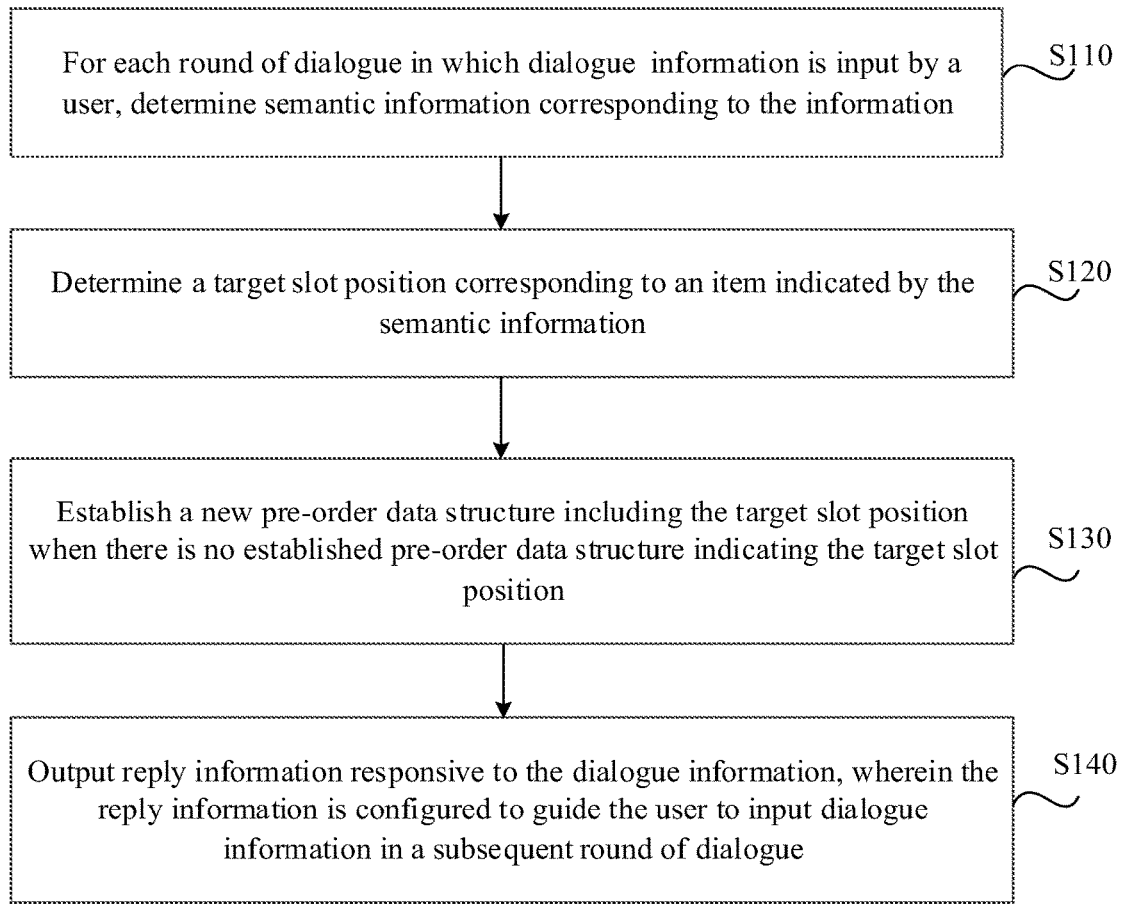
FIG. 3 is a flow diagram of a man-machine dialogue method shown according to an example of the disclosure.

FIG. 3 is a flow diagram of the man-machine dialogue method shown according to an example. The method may be implemented in an electronic device. The electronic device is, for example, a mobile terminal or a server. The mobile terminal includes: a mobile phone, a notebook, a tablet computer, a desktop computer, an intelligent speaker, an intelligent television, a wearable device, an intelligent robot, a vehicle-mounted terminal, and a terminal mounted with an intelligent speech assistant. The server includes a local server and a cloud server.

The method includes: S110, in each successive, respective round of a plurality of rounds of dialogue, dialogue information is input by a user and semantic information corresponding to the dialogue information is determined. In this specification, the term 'semantic information' refers to information about the meaning of spoken or written words and phrases, signs, symbols etc. comprising the dialogue. One piece of the spoken or written words comprising the dialogue may correspond to a piece of data, and that piece by itself does not necessarily convey any meaning. However, the ideas, concepts, commands, thoughts, etc., actually expressed by the combinations of symbols, words and phrases in the text and speech comprising the dialogue may have meaning in combination, and the meaning can be determined by obtaining semantic information provided by a semantic recognition process. For example, the semantic information can indicate an item.

A round of dialogue refers to a unit of dialogue in which the user takes one turn by inputting written or spoken dialogue information, and the electronic device takes one turn by outputting reply information.

S120, A target slot position corresponding to the item indicated by the semantic information is determined. The item may be indicated by a commodity name and/or a commodity attribute. An item may be cola, Sprite, a shirt, shorts, etc., and may further be a large cup, a small cup, a shirt color, a length of shorts, etc.

Each item may correspond to one slot position. Because the item may be indicated by the commodity name and/or the commodity attribute, accordingly, the slot position corresponding to the commodity may be understood as an orderable commodity unit. For example, the slot position corresponding to the commodity may be food, beverages, refreshments, tops, bottoms, inner cloth, etc., which can each serve as the orderable commodity unit. The slot position corresponding to the commodity attribute may be understood as a category to which one commodity attribute belongs. For example, the slot position corresponding to the commodity attribute may be beverage sweetness, beverage capacity, a color of the tops, a size of the bottoms, a color of the inner cloth, etc.

The slot position corresponding to a certain item may be regarded as a target slot position corresponding to the item. For example, a target slot position corresponding to cola is beverage, a target slot position corresponding to Sprite is also beverage, and a target slot position corresponding to shirt is tops. Thus it can be seen that a plurality of different items may correspond to the same target slot position.

For example, as a piece of semantic information the words "give me a big Mac big set meal," indicate the item "big Mac big set meal" and the target slot position corresponding to the item is "food". For another example, as a piece of semantic information the words, "I want to buy a cola, a small cup", the item indicated is "cola, small cup". In this case, a target slot position corresponding to the item "cola" is "beverage", and a target slot position corresponding to the item "small cup" is "beverage capacity".

S130, a new pre-order data structure including the target slot position is established when there is no established pre-order data structure including the target slot position. The new pre-order data structure includes at least one slot position and at least one configurable item corresponding to each slot position when dispensing a commodity. The configurable item may be configured to configure the above commodity or commodity attribute.

After the target slot position corresponding to the item indicated by the semantic information is determined, the pre-order data structure corresponding to a present round of dialogue may be matched to find out whether there is any established pre-order data structure including the target slot position, e.g., a pre-order data structure that was established prior to the present round of dialogue. If not, the new pre-order data structure including the target slot position is established.

There may be various cases in which there is no established pre-order data structure including the target slot position before this round of dialogue. In some cases, when this round is a first round of dialogue, the electronic device does not store any pre-order data structure. In this case, there is no established pre-order data structure including the target slot position before a first round.

In some other cases, when a current round is not the first round of dialogue, such as a second round and a third round, although the electronic device stores the pre-order data structure, the electronic device does not store the pre-order data structure including the target slot position. For example, the electronic device stores the pre-order data structure (the food: the big Mac big set meal, the beverage: Sprite, and the refreshments: large fries), and the dialogue information of this round is "Give me an ice cream". At this time, a target slot position corresponding to the item "ice cream" is "dessert." In this case, there is no established pre-order data structure including the target slot position before this round. At this time, a new pre-order data structure including the target slot position "dessert" may be established. For example, this may be (dessert: ice cream).

The above steps S110-S130 are executed for each round of dialogue in which dialogue information is input by the user. In this way, when the user has a shopping need for various commodities, even if there was no established pre-order data structure including the target slot position before a round of dialogue, a new pre-order data structure including the target slot position may also be established, so as to obtain a pre-order data structure capable of supporting the various different categories of commodities, and support the shopping need for the various determined commodities. When there is a pre-order data structure including the target slot position established before this round of dialogue, the pre-order data structure may be updated based on the item, so as to obtain an updated pre-order data structure.

S140, reply information is output responsive to the input dialogue information, wherein the reply information is configured to guide the user to input new dialogue information in a subsequent round of dialogue. In a case that the new round of dialogue information input by the user includes a keyword for indicating ordering, an ordering operation is performed according to a finally-established pre-order data structure.

In the examples of this disclosure, whether or not a new pre-order data structure is created, the reply information is generated and output to the user, and this information is configured to guide the user to input the new dialogue information in a subsequent round of dialogue.

It may be understood that the user may continue choosing items in the subsequent round of dialogue or the user may complete choosing items and perform ordering. If, in the subsequent round of dialogue, dialogue information input by the user includes a keyword for indicating ordering, it may be understood that the user has completed choosing items and wishes to proceed to perform ordering of the items. Then, the ordering operation is performed according to the finally-established pre-order data structure. The keyword for indicating ordering may be any of a variety of keywords including ordering, choosing, confirming, not needing anything else, etc.

By adopting the above method, when the user has shopping needs for various commodities, the various commodities may be managed in a mode of increasing the number of commodities indicated by the order data structure. If, in the subsequent round of dialogue, dialogue information input by the user includes the keyword for indicating ordering, the ordering operation is performed according to the finally established pre-order data structure, an operation of managing the various commodities and ordering the various commodities in a one-time dialogue process is achieved, so that when the user has a purchase need for the various commodities, the user does not need to perform an entire dialogue process and ordering for each commodity, thereby improving the online shopping efficiency.

In some possible implementations, the step of outputting the reply information responsive to the dialogue information may include: in a case that there is a slot position with a slot position value being null in the established pre-order data structure, the reply information is output according to the slot position, wherein the reply information is configured to guide the user to input dialogue information for updating the slot position value of the slot position; and in a case that there is no slot position with the slot position value being null in the established pre-order data structure, reply information configured to guide the user to confirm ordering is output. It may be understood that in the different cases, the different reply information may be output.

In one case, when the user does not complete choosing, the user needs to be reminded supplement incomplete choosing information. In the example of the disclosure, because the pre-order data structure includes the at least one slot position, and each slot position corresponds to one configurable item during issuing of the commodity, in the case that there is the slot position with the slot position value being null in the established pre-order data structure, that is, there is still the configurable item needing to be configured during issuing of the commodity, the reply information configured to guide the user to input the dialogue information for updating the slot position value of the slot position may be output. When the reply information is output according to the slot position with the slot position value being null, the slot position with the slot position value being null may be included in the reply information.

It is assumed that after obtaining dialogue information input by the user in a round of dialogue, there are two established pre-order data structures, respectively (the food: the big Mac big set meal, the beverage: Sprite, and the refreshments: large fries) and (the food: family set meal, the beverage: " ", and the refreshments: " "). In this case, the reply information may be output according to the slot position with the slot position value being null, for example, a question: "What is respectively selected for the beverage and the refreshments?" is output.

In one case, when the user completes ordering after a round of dialogue, the user needs to be reminded to order. In the case that there is no slot position with the slot position value being null in the established pre-order data structure, that is, there is no configurable item needing to be configured during issuing of the commodity, the reply information configured to guide the user to confirm ordering may be output.

It is assumed that in this round, after obtaining this dialogue information input by the user, there are two established pre-order data structures, respectively (the food: the big Mac big set meal, the beverage: Sprite, and the refreshments: large fries) and (the food: family set meal, the beverage: Sprite, and the refreshments: chicken wings). In this case, the reply information configured to guide the user to confirm ordering may be output, for example, the question: "Ok, do you need anything else, if not, please place the order" is output.

By adopting the above method, the different reply information may be correspondingly output according to whether there is the slot position with the slot position value being null in the established pre-order data structure, so that the reply information is more accurate, and a guiding effect for the user is high, and this improves the user online shopping efficiency.

In addition, in consideration that in some cases, the user may input dialogue information containing the item of a non-primary key type at the beginning of the dialogue, for example, the first sentence of the dialogue in this instance is "Give me a small cup.", In this case, any information indicating the commodity name cannot be ascertained. If there is no pre-order data structure including the target slot position before this round of dialogue, ordering cannot be performed even if the slot position of the non-primary key type is obtained. In this case, reply information for asking the user to reinput the contained commodity, for example, please input the commodity name preferentially.

In some possible implementations, the step of determining the target slot position corresponding to the item included by the semantic information may include: in preset configuration information, the target slot position corresponding to the item and a slot position type of the target slot position are determined. In this case, the step of establishing the new pre-order data structure including the target slot position if there is no pre-order data structure including the target slot position before this round of dialogue may further include: in a case that the slot position type corresponding to the target slot position is a primary key type, the new pre-order data structure including the target slot position is established if there is no established pre-order data structure including the target slot position before this round of dialogue.

In the example of the disclosure, configuration information may be preset. The configuration information records a corresponding relationship between the item and the slot position, and a slot position type corresponding to each slot position. After the semantic information corresponding to the dialogue information is obtained, the preset configuration information may be queried, so as to determine the target slot position corresponding to the item indicated by the semantic information, and the slot position type corresponding to the target slot position.

The slot position type includes a primary key type and a non-primary key type, the primary key type is a type of a slot position corresponding to the commodity name, and the non-primary key type is a type of a slot position corresponding to the commodity attribute. Slot position types corresponding to the slot positions such as food, beverages, refreshments, tops, bottoms, inner cloth, and the like are the primary key types. Slot position types corresponding to the slot positions such as beverage sweetness, beverage capacity, a color of the tops, a size of the bottoms, a color of the inner cloth, and the like are the non-primary key types.

In the example of the disclosure, no matter how many rounds of dialogue occur before dialogue information is input in the current round, if the slot position type of the target slot position corresponding to the item is the primary key type, information of the commodity name may be obtained. The new pre-order data structure including the target slot position may be established in the case that there is no established pre-order data structure including the target slot position, established before this round of dialogue.

A process of newly establishing the pre-order data structure including the target slot position is illustrated below. It is assumed that the following scenario exists: The first round of dialogue information: User: Give me a big Mac big set meal.

It is determined that the item is a big Mac big set meal, the target slot position corresponding to the item is food. Because this is the first round of dialogue, there is no pre-order data structure including the target slot position established before this round of dialogue. At this time, the pre-order data structure including the food is newly established. In addition, according to the configuration information, it may be determined that the set meal includes the three primary key slot positions of food, beverage, and refreshments. The pre-order data structure at this time is (the food: the big Mac big set meal, the beverage: " ", and the refreshments: " "). At this time, the electronic device may output the reply information responsive to the dialogue information, for example, output "What are respectively selected for the beverage and the refreshments".

Figure 4:
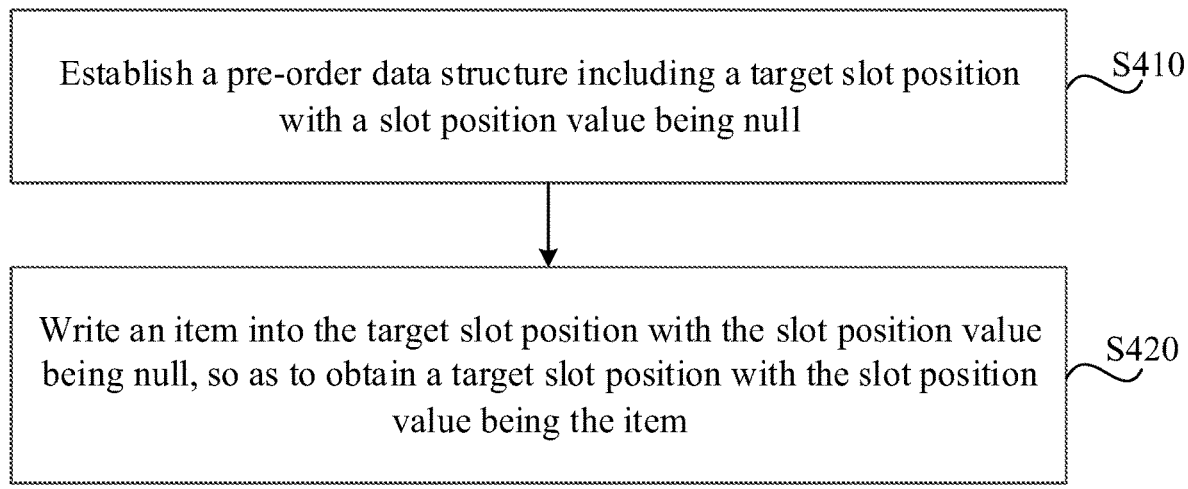
FIG. 4 is a flow diagram of another man-machine dialogue method shown according to an example of the disclosure.

As shown in FIG. 4, the step of newly establishing the pre-order data structure (or establishing a new pre-order data structure) including the target slot position may include the following two sub-steps. At S410, a new pre-order data structure including a target slot position with a slot position value being null is established. At S420, the item is written into the target slot position with the slot position value being null, so as to obtain the target slot position with the slot position value being the item.

In some possible implementations, it can be known in combination with the aforementioned content that when the pre-order data structure before this round of dialogue be matched to find whether there is the pre-order data structure including the target slot position before this round of dialogue, if there is the pre-order data structure including the target slot position before this round of dialogue, the pre-order data structure may be updated by utilizing the item, so as to obtain an updated pre-order data structure. Updating may include modifying or deleting contents in the target slot position in the pre-order data structure. Correspondingly, the operation type includes a modifying type and a deleting type.

In this case, the semantic information may further include an operation type corresponding to the item. The updating the pre-order data structure by utilizing the item, so as to obtain the updated pre-order data structure may include: if there is the pre-order data structure including the target slot position before this round of dialogue, the target slot position included by the pre-order data structure is updated according to the operation type and the item, so as to obtain the updated pre-order data structure.

A process of updating the pre-order data structure by utilizing the item is illustrated below. Following the aforementioned example, the first round of dialogue information is unchanged, and a second round of dialogue information and a third round of dialogue information are respectively as follows: The second round of dialogue information: User: big cola and large fries.

The electronic device determines that the items are the big cola and the large fries. The target slot positions corresponding to the items are respectively beverage and refreshments. An operation type corresponding to the big cola is modifying. An operation corresponding to the large fries is modifying. And, it is detected that the previous pre-order data structure includes the two target slot positions of beverage and refreshments. At this time, the item "big cola" may be utilized to modify a slot position value corresponding to the target slot position "beverage", and the item "large fries" is utilized to modify a slot position value corresponding to the target slot position "refreshments". The obtained updated pre-order data structure is (the food: the big Mac big set meal, the beverage: the big cola, and the refreshments: large fries). At this time, the electronic device may output the reply information responsive to the second round of dialogue information, for example, output "Ok, do you need anything else, if not, please place the order".

Figure 5:
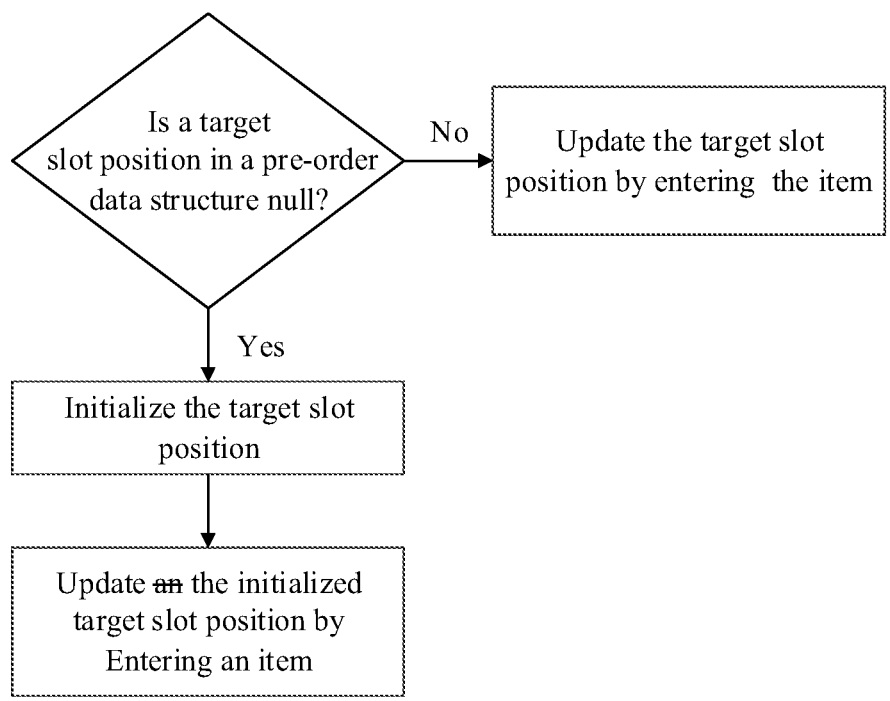
FIG. 5 is a flow diagram of updating a pre-order data structure shown according to an example of the disclosure.

The above example describes a processing process of a modifying process included by updating, namely, the processing process when the operation type is a modifying type. As shown in FIG. 5, when the operation type is the modifying type, the updating the pre-order data structure by utilizing the item includes the following processes: whether the target slot position in the pre-order data structure is null is judged firstly; if not null, the target slot position is updated by directly utilizing the item so as to obtain the updated pre-order data structure; and if null, the target slot position is initialized, and then the initialized target slot position is updated by utilizing the item.

The third round of dialogue information: User: I don't want to drink the big cola, changes into a large Sprite. The electronic device determines that the items are the big cola and the large Sprite, the target slot positions corresponding to the items of big cola and large Sprite and both are a beverage, the operation type corresponding to the big cola is deleting, an operation corresponding to the large Sprite is modifying, and it is detected that the previous pre-order data structure includes the target slot position of beverage. At this time, a slot position value corresponding to the target slot position "beverage" may be deleted firstly. Subsequently, the pre-order data structure is (the food: the big Mac big set meal, the beverage: " ", and the refreshments: large fries), and then the item "large Sprite" is utilized to modify the slot position value corresponding to the target slot position "beverage". The obtained updated pre-order data structure is (the food: the big Mac big set meal, the beverage: the large Sprite, and the refreshments: large fries). At this time, the electronic device may output the reply information responsive to the third round of dialogue information, for example, output "Ok, do you need anything else, if not, please place the order".

Figure 6:
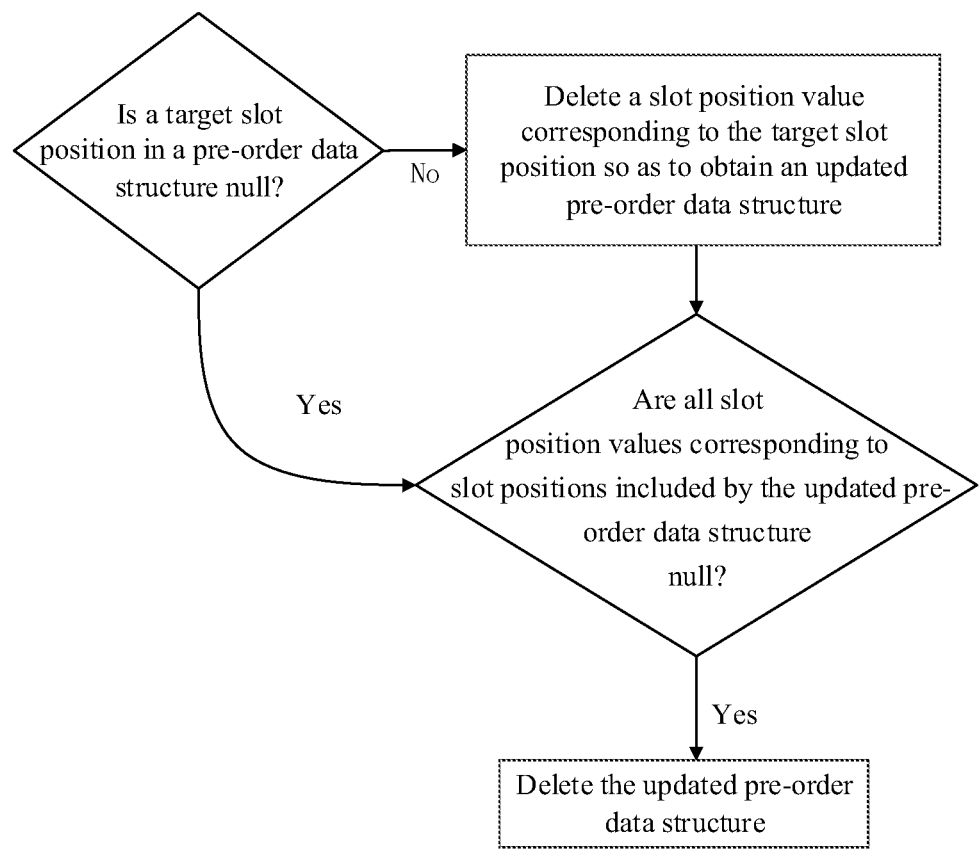
FIG. 6 is a flow diagram of updating another pre-order data structure shown according to an example of the disclosure.

The above example describes a processing process of deleting and updating processes included by updating, namely, the processing process when the operation type is a deleting type and updating type. As shown in FIG. 6, when the operation type is the deleting type, the updating the pre-order data structure by utilizing the item includes the following processes: whether the target slot position in the pre-order data structure is null is judged firstly; if not null, the slot position value corresponding to the target slot position is directly deleted so as to obtain the updated pre-order data structure; and if null, the following steps may be executed.

It will be understood upon reading the above description, that when the operation type is the deleting type, the slot position value corresponding to the target slot position is deleted. In some cases, the user may delete all the slot position values of at least one slot position in the certain pre-order data structure. Following the aforementioned examples, it is assumed that the first round of dialogue information is unchanged and the second round of dialogue information is unchanged, the third round of dialogue information is changed into "user: Forget it, I don't want to have the big Mac big set meal, and don't want to have the big cola and the large fries as well".

In this case, the updated pre-order data structure obtained according to the dialogue information is (the food: " ", the beverage: " ", the refreshments: " "), the commodity name cannot be obtained according to the pre-order data structure, and, the pre-order data structure is meaningless.

In order to save an internal storage resource, in some implementations, continue to refer to FIG. 6, the man-machine dialogue method of the example of the disclosure may further include the following steps: whether slot position values corresponding to slot positions included by the updated pre-order data structure are all null is determined; and in a case that the slot position values corresponding to the slot positions included by the updated pre-order data structure are all null, the updated pre-order data structure is deleted.

It can be seen that as shown in above examples, when the updated pre-order data structure is (the food: " ", the beverage: " ", the refreshments: " "), the slot position values corresponding to all the slot positions is null. At this time, the updated pre-order data structure may be deleted. By adopting the above mode, in the case that the slot position values corresponding to the slot positions included by the updated pre-order data structure are all null, the updated pre-order data structure may be deleted, so as to save internal storage resources.

It will be understood from the aforementioned content that in the case that there is the slot position with the slot position value being null in the established pre-order data structure, the reply information may be output according to the slot position. However, there may be many pre-order data structures. In the case that there are the slot positions with the slot position values being null in the plurality of pre-order data structures, there may be a plurality of modes for outputting the reply information.

In some implementations, the reply information may be output according to all the slot positions with the slot position values being null. It is assumed that after obtaining dialogue information input by the user in this round, there will be two established pre-order data structures, respectively (the food: beef noodles, pungency degree: " ", and a portion size: 100 grams) and (the food: family set meal, the beverage: " ", and the refreshments: " "). In this case, the reply information may be output according to the slot position with the slot position value being null. For example, "How to select the pungency degree of the beef noodles, and what are respectively selected for the beverage and the refreshments in the family set meal" is output.

In some other possible implementations, the reply information may be output sequentially for all the slot positions with the slot position values being null corresponding to all the pre-order data structures. In this case, the step of outputting the reply information responsive to the dialogue information may include: whether there is the slot position with the slot position value being null in the updated pre-order data structure is determined; in the case that there is the slot position with the slot position value being null in the updated pre-order data structure, the reply information corresponding to the slot position with the slot position value being null in the updated pre-order data structure is output; and in a case that there is no slot position with the slot position value being null in the updated pre-order data structure, whether there is the slot position with the slot position value being null in the pre-order data structure is sequentially judged according to an establishing sequence of other established pre-order data structures from back to front (or from most recent to oldest), and in a case that it is determined that there is the slot position with the slot position value being null in any pre-order data structure, the reply information corresponding to the slot position with the slot position value being null in any pre-order data structure is output.

In the example of the disclosure, whether there is the slot position with the slot position value being null in the updated pre-order data structure obtained in this round by updating dialogue information is preferentially judged. If so, the reply information corresponding to the slot position with the slot position value being null in the updated pre-order data structure is output.

If not, whether there is the slot position with the slot position value being null in the pre-order data structure is sequentially judged according to the establishing sequence of other established pre-order data structures. And, in the case that it is determined that there is the slot position with the slot position value being null in any pre-order data structure, the reply information corresponding to the slot position with the slot position value being null in any pre-order data structure is output.

It is assumed that after obtaining dialogue information input by the user in this round, there are three established pre-order data structures, respectively the pre-order data structure (the food: beef noodles, the pungency degree: " ", and the portion size: 100 grams) established after the dialogue information in the first round, the pre-order data structure (the food: big Mac big set meal, the beverage: the big cola, and the refreshments: chicken wings) established after the second round of dialogue, and the pre-order data structure (the food: the family set meal, the beverage: the large Sprite and the refreshments: " ") obtained after this round (the fourth round) of the user inputting dialogue information by updating the pre-order data structure (the food: the family set meal, the beverage: the big cola, and the refreshments: " ") obtained from the third round of the user inputting dialogue information. In this case, "What refreshments are needed in the family set meal" may be output firstly.

Then it is assumed that dialogue information input by the user in the fifth round is "chicken wings." Thus the item "chicken wings" and the corresponding operation type being the modifying type are obtained, and the pre-order data structure (the food: the family set meal, the beverage: the large Sprite and the refreshments: " ") may be modified as (the food: the family set meal, the beverage: the large Sprite, and the refreshments: the chicken wings). At this time, the corresponding updated pre-order data structure is (the food: the family set meal, the beverage: the large Sprite, and the refreshments: the chicken wings). In this case, there is the slot position with the slot position value being null in the updated pre-order data structure, the pre-order data structure (the food: the big Mac big set meal, the beverage: the big cola, and the refreshments: the chicken wings) established after the second round of dialogue may be found firstly. Because there is no slot position with the slot position value being null in the pre-order data structure (the food: the big Mac big set meal, the beverage: the big cola, and the refreshments: the chicken wing), then the pre-order data structure (the food: beef noodles, the pungency degree: " ", and the portion size: 100 grams) established after the information input in the first round of dialogue is found, in this case, "How to select the pungency degree of the beef noodles" may be output firstly.

In some other cases, whether there is the slot position with the slot position value being null in the pre-order data structure may also be sequentially judged according to a random sequence, and in the case that it is determined that there is the slot position with the slot position value being null in any pre-order data structure, the reply information corresponding to the slot position with the slot position value being null in any pre-order data structure is output.

In some possible implementations, the man-machine dialogue method may be applied in an online speech dialogue shopping scenario. In this case, the system architecture shown in FIG. 1 may be adopted. In this scenario, the man-machine dialogue method may further include the steps:

speech information input by the user is obtained in each round of dialogue; and speech recognition is performed on the speech information obtained in each round, so as to obtain input dialogue information for each round. Accordingly, the step of outputting the reply information may include: performing text to speech conversion on the reply information, so as to obtain the reply information of a speech type; and the reply information of the speech type is output in a speech mode.

It can be understood that an Automatic Speech Recognition (ASR) module, a Natural Language Understanding (NLU) module, a Dialog State Tracker (DST) module, a Dialogue Policy (POL) module, a Natural Language Generation (NLG) module, a Text To Speech (TTS) module, and a database may be built in the intelligent speech speaker.

In some other possible implementations, the man-machine dialogue method may be applied to an online text dialogue shopping scenario. In this case, the system architecture shown in FIG. 2 may be adopted. At this time, the dialogue information is input through a client side interface in a text form. Accordingly, the step of outputting the reply information may include: the reply information is output through the client side interface.

It may be understood that a Natural Language Understanding (NLU) module, a Dialog State Tracker (DST) module, a Dialogue Policy (POL) module, a Natural Language Generation (NLG) module, and a database may be built in an intelligent terminal. The examples disclosed herein may further achieve online shopping in a text form, and thereby enrich ing a shopping path.

It should be noted that the above electronic device may further be an electronic device in a server. That is, a local intelligent speaker or intelligent terminal may complete a function of collecting audio data or collecting text data, so that the audio data or the text data are sent to the server to be processed. After obtaining the reply information, the server sends the reply information to the local intelligent speaker or intelligent terminal to be output.

It should be noted that the examples above all rely on the slot position included by the pre-order data structure as the primary key slot position. In actual practice, the slot position included by the pre-order data structure may include the primary key slot position, and affiliated non-primary key slot position corresponding to part or all of the primary key slot position. The pre-order data structure may simultaneously include the primary key slot position and the non-primary key slot position. The following are brief examples of some pre-order data structures: (the food: beef noodles, the pungency degree: mildly spicy, and the portion size: 100 grams); and (the food: bake bread set meal, the refreshments: chicken wings, and specification: small portion).

It can be seen that the man-machine dialogue method of the examples described in this disclosure may manage the various commodities, and meanwhile may be detailed into the more fine-grained management such as attributes of various commodities.

Figure 7:
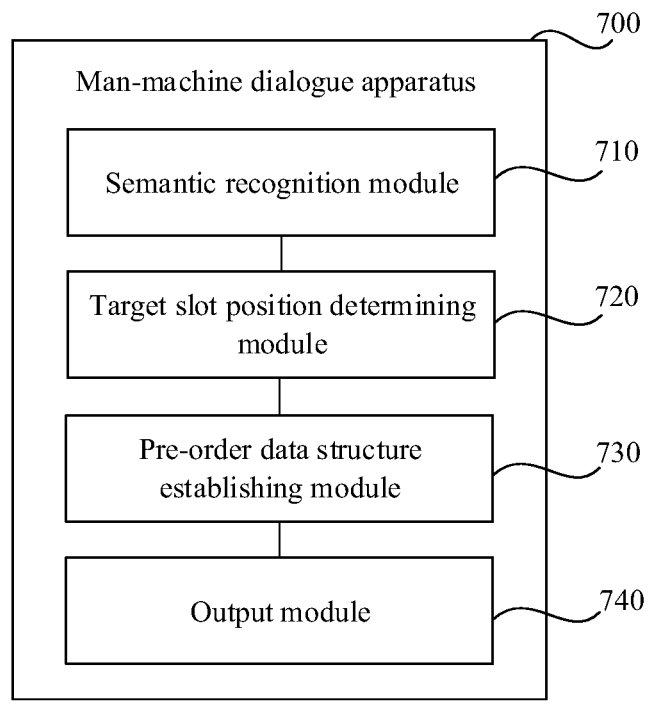
FIG. 7 is a structure block diagram of a man-machine dialogue apparatus shown according to an example of the disclosure.

FIG. 7 is a structure block diagram of a man-machine dialogue apparatus 700 shown according to an example of the disclosure. Referring to FIG. 7, the apparatus includes: a semantic recognition module 710, a target slot position determining module 720, a pre-order data structure establishing module 730 and an output module 740. In which: The semantic recognition module 710, is configured to determine a semantic information corresponding to dialogue information input by a user in each round of dialogue. The target slot position determining module 720, is configured to determine a target slot position corresponding to an item indicated by the semantic information, and the item being indicated by a commodity name and/or a commodity attribute.

The pre-order data structure establishing module 730, is configured to establish a new pre-order data structure including the target slot position when there is no pre-order data structure including the target slot position before a present round of dialogue, wherein the pre-order data structure includes at least one slot position, and at least one configurable item corresponding to each slot position during issuing of a commodity. The output module 740, is configured to output reply information responsive to the dialogue information, wherein the reply information is configured to guide a user to input a new dialogue information in a subsequent round of dialogue.

In some examples, the output module 740 includes: a first output submodule, configured to: in a case that there is a slot position with a slot position value being null in the established pre-order data structure, output the reply information according to the slot position, wherein the reply information is configured to guide the user to input dialogue information for updating the slot position value of the slot position. The output module further includes: a second output submodule, configured to: in a case that there is no slot position with the slot position value being null in the established pre-order data structure, output reply information configured to guide the user to confirm ordering.

In some examples, the target slot position determining module 720 is further configured to: in preset configuration information, determine a target slot position corresponding to an item and a slot position type of the target slot position, in which the slot position type includes a primary key type and a non-primary key type, the primary key type is a type of a slot position corresponding to the commodity name, and the non-primary key type is a type of a slot position corresponding to the commodity attribute. In this case, the pre-order data structure establishing module 730 is further configured to establish the new pre-order data structure including the target slot position when there is no pre-order data structure including the target slot position before this round of dialogue in a case that the slot position type corresponding to the target slot position is the primary key type.

In some examples, the semantic information further includes an operation type corresponding to the item, and the apparatus 700 further includes: an updating module, configured to: when there is the pre-order data structure including the target slot position before a current round of dialogue, update the target slot position included by the pre-order data structure according to the operation type and the item, so as to obtain an updated pre-order data structure.

In some examples, the apparatus 700 further includes: a slot position value determining module, configured to determine whether all slot position values corresponding to slot positions included by the updated pre-order data structure are null. A pre-order data structure deleting module, configured to: in a case that all of the slot position values corresponding to the slot positions included by the updated pre-order data structure are null, delete the updated pre-order data structure.

In some examples, the output module 740 includes: a slot position value determining submodule, configured to determine whether there is a slot position with a slot position value being null in the updated pre-order data structure; a third output submodule, configured to: in a case that there is the slot position with the slot position value being null in the updated pre-order data structure, output reply information corresponding to the slot position with the slot position value being null in the updated pre-order data structure. A fourth output submodule is configured to: in a case that there is no slot position with the slot position value being null in the updated pre-order data structure, judge whether there is a slot position with the slot position value being null in the pre-order data structure according to an order in which other pre-order data structures were established, e.g., in order of most recent to oldest, or from back to front. And, in a case that it is determined that there is a slot position with the slot position value being null in any pre-order data structure, output the reply information corresponding to the slot position with the slot position value being null in the updated pre-order data structure.

In some examples, the apparatus 700 further includes: an obtaining module, configured to obtain speech information input by the user in each round of a plurality of rounds of dialogue. An automatic speech recognition module, configured to perform speech recognition on the input speech information in each round, so as to obtain input dialogue information in each round. In this case, the output module 740 is further configured to perform text to speech conversion on the reply information, so as to obtain reply information of a speech type; and output the reply information of the speech type in a speech mode. As for the apparatus in the above examples, the specific modes for executing operations by all the modules have be described in the examples related to the method in detail, and the details will not be repeated here.

The disclosure further provides a non-transitory computer readable storage medium, storing a computer program comprising computer-readable instructions. The instructions, when executed by a computer, configure the computer to implement steps of the man-machine dialogue method provided by the disclosure.

Figure 8:
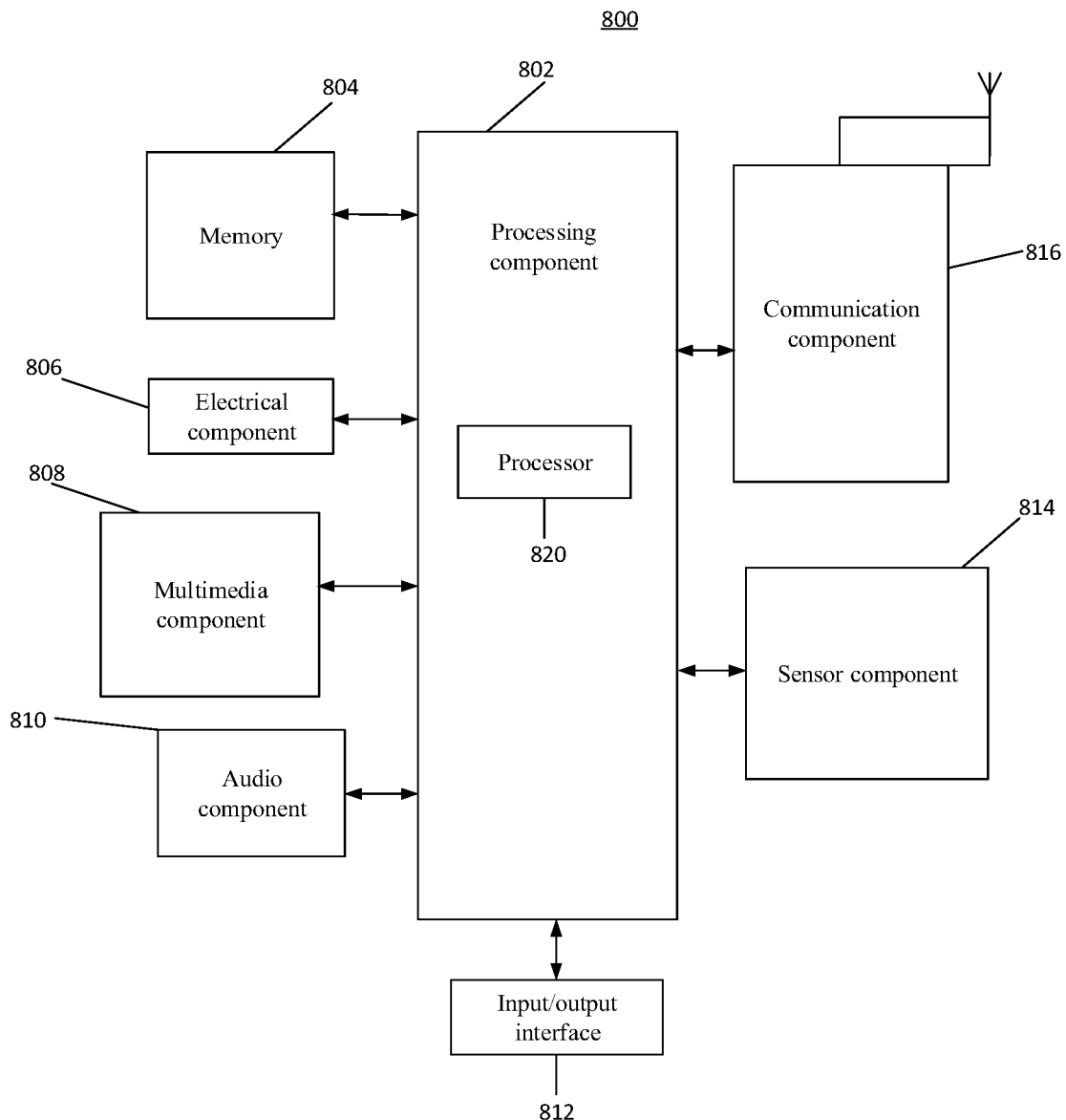
FIG. 8 is a block diagram of an electronic device shown according to an example of the disclosure.

FIG. 8 is a block diagram of an electronic device 800 shown according to an example of the disclosure. For example, the electronic device 800 may be a mobile telephone, a computer, a digital broadcast terminal, a message transceiver device, a game console, a tablet device, a medical device, a fitness device, a personal digital assistant, and the like. Referring to FIG. 8, the electronic device 800 may include one or more of the following components: a processing component 802, a memory 804, an electrical component 806, a multimedia component 808, an audio component 810, an input/output (I/O) interface 812, a sensor component 814, and a communication component 816.

The processing component 802 controls overall operation of the electronic device 800, such as operations associated with display, telephone calling, data communication, a camera operation and a record operation. The processing component 802 may include one or more processor 820 to execute instructions, so as to complete all or part of steps of the above man-machine dialogue method. In addition, the processing component 802 may include one or more modules that facilitate interaction between the processing component 802 and other components. For example, the processing component 802 may include a multimedia module, so as to facilitate interaction between the multimedia component 808 and the processing component 802.

The memory 804 is configured to store various types of data and instructions so as to support operations on the electronic device 800. Examples of these data and instructions include instructions of any application programs or methods configured to be operated on the electronic device 800, contact data, telephone directory data, messages, pictures, videos, and the like. The memory 804 may be implemented by any type of volatile or nonvolatile storage device or their combinations, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The electrical component 806 provides electric power for various components of the electronic device 800. The electrical component 806 may include a power management system, one or more power sources, and other components associated with generating, managing and distributing electric power for the electronic device 800.

The multimedia component 808 includes a screen providing an output interface between the electronic device 800 and a user. In some examples, the screen may include a liquid crystal display (LCD) and a touch panel (TP). If the screen includes the touch panel, the screen may be implemented as a touch screen so as to receive an input signal from the user. The touch panel includes one or more touch sensors to sense touching, swiping and gestures on the touch panel.

The touch sensor may not only sense a boundary of a touching or swiping action, but also detect duration and pressure related to the touching or swiping operation. In some examples, the multimedia component 808 includes a front camera and/or a back camera. When the electronic device 800 is in an operation mode, such as a shooting mode or a video mode, the front camera and/or the back camera may receive external multimedia data. Each front camera and each back camera may be a fixed optical lens system or have a focal length and optical zooming capability.

The audio component 810 is configured to output and/or input an audio signal. For example, the audio component 810 includes a microphone (MIC). When the electronic device 800 is in the operation mode, such as a call mode, a recording mode or a speech recognition mode, the microphone is configured to receive an external audio signal. The received audio signal may be further stored in the memory 804 or sent via the communication component 816. In some examples, the audio component 810 further includes a speaker for outputting an audio signal.

The I/O interface 812 provides an interface between the processing component 802 and a peripheral interface module, and the above peripheral interface module may be a keyboard, a click wheel, buttons, etc. These buttons may include but are not limited to: a home button, a volume button, a start button and a lock button.

The sensor component 814 includes one or more sensors for providing state evaluations of all aspects for the electronic device 800. For example, the sensor component 814 may detect a start/shutdown state of the electronic device 800 and relative positioning of components, for example, the components are a display and a keypad of the electronic device 800. The sensor component 814 may further detect position change of the electronic device 800 or one component of the electronic device 800, whether there is contact between the user and the electronic device 800, azimuth or speed up/speed down of the electronic device 800, and temperature change of the electronic device 800. The sensor component 814 may include a proximity sensor, and is configured to detect existence of a nearby object without any physical contact. The sensor component 814 may further include an optical sensor, such as a CMOS or CCD image sensor, for use in imaging application. In some examples, the sensor component 814 may further include an acceleration sensor, a gyroscope sensor, a magnetic sensor, a pressure sensor or a temperature sensor.

The communication component 816 is configured to facilitate wired or wireless communication between the electronic device 800 and other devices. The electronic device 800 may access a wireless network based on a communication standard, such as WiFi, 2G or 3G, or their combination. In an example, the communication component 816 receives a broadcast signal or related broadcast information from an external broadcast management system via a broadcast channel. In an example, the communication component 816 further includes a near-field communication (NFC) module so as to facilitate short-range communication. For example, the NFC module may be implemented based on a radio frequency identification (RFID) technology, an infrared data association (IrDA) technology, an ultra wide band (UWB) technology, a Bluetooth (BT) technology and other technologies.

In the example, the electronic device 800 may be implemented by one or more application specific integrated circuits (ASICs), digital signal processors (DSPs), digital signal processing devices (DSPDs), programmable logic devices (PLDs), field-programmable gate arrays (FPGAs), controllers, microcontrollers, microprocessors or other electronic elements for executing the above man-machine dialogue method.

In the example, a non-transitory computer readable storage medium including computer-readable instructions is further provided, such as a memory 804 including instructions. The above instructions may be executed by a processor 820 of the electronic device 800 so as to complete the above man-machine dialogue method. For example, the non-temporary computer readable storage medium may be an ROM, a random access memory (RAM), a CD-ROM, a magnetic tape, a floppy disk, an optical data storage device and the like.

In another example, a computer program product is further provided. The computer program product contains a computer program capable of being executed by a programmable apparatus, and the computer program has a code part for executing the above man-machine dialogue method when being executed by the programmable apparatus.

Those of skill in the art will easily figure out other implementation solutions of the disclosure after considering the specification and practicing the disclosure. The disclosure intends to cover any transformation, usage or adaptive change of the disclosure, and these transformations, usages or adaptive changes conform to a general principle of the disclosure and include common general knowledge or conventional technical means which are not disclosed herein in the technical field. The specification and the examples are regarded as exemplary, and the true scope and spirit of the disclosure are indicated by the following claims.

It will be appreciated that the disclosure is not limited to the exact construction that has been described above and shown in the accompanying drawings, and that various modifications and changes may be made without departing from the scope thereof. It is intended that the scope of the disclosure only be limited by the appended claims.

What is claimed is:

1. A man-machine dialogue method, comprising:
   for each successive, respective round of a plurality of rounds of dialogue wherein each round includes dialogue information input by a user, determining semantic information corresponding to the dialogue information input by the user;
   determining a target slot position corresponding to an item indicated by the semantic information, the item indicated by a commodity name and/or a commodity attribute;
   establishing a new pre-order data structure comprising the target slot position when there is no established pre-order data structure comprising the target slot position, wherein the new pre-order data structure comprises at least one slot position and at least one item that is configurable during dispensing of a commodity corresponding to the at least one slot position;
   outputting reply information responsive to the dialogue information input by the user, wherein the reply information is configured to guide the user to input new dialogue information in a subsequent round of dialogue;
   in a case that the new dialogue information input by the user in the subsequent round of dialogue comprises a keyword indicating ordering, performing an ordering operation according to a finally-established pre-order data structure;
   wherein the semantic information further comprises an operation type corresponding to the item, and the method further comprises:
   when there is an established pre-order data structure comprising the target slot position, updating the target slot position comprising the established pre-order data structure according to the operation type and the item, so as to obtain an updated pre-order data structure;
   wherein outputting the reply information responsive to the dialogue information comprises:
   determining whether there is a slot position with a slot position value being null in the updated pre-order data structure; and
   in a case that there is no slot position with the slot position value being null in the updated pre-order data structure, sequentially judging whether there is a slot position with the slot position value being null in the pre-order data structure according to an order of establishing other pre-order data structures from the most recently established to the oldest established, and in a case that it is determined that there is a slot position with the slot position value being null in any pre-order data structure, outputting the reply information corresponding to the slot position with the slot position value being null in the updated pre-order data structure.

2. The method according to claim 1, wherein outputting the reply information responsive to the dialogue information comprises:
   in a case that there is a target slot position with a slot position value being null in the new pre-order data structure, outputting the reply information according to the target slot position with the slot position value being null, wherein the reply information is configured to guide the user to input dialogue information for updating the slot position value of the target slot position.

3. The method according to claim 1, wherein outputting the reply information responsive to the dialogue information comprises:
   in a case that there is no target slot position with a slot position value being null in the established pre-order data structure, outputting reply information configured to guide the user to confirm ordering.

4. The method according to claim 1, wherein determining the target slot position corresponding to the item indicated by the semantic information comprises:
   in preset configuration information, determining the target slot position corresponding to the item and a slot position type of the target slot position, wherein the slot position type comprises a primary key type and a non-primary key type, the primary key type is a type of a slot position corresponding to the commodity name, and the non-primary key type is a type of a slot position corresponding to the commodity attribute; and
   wherein establishing the pre-order data structure comprising the target slot position when there is no established pre-order data structure comprising the target slot position further comprises: in a case that the slot position type corresponding to the target slot position is the primary key type, establishing a new pre-order data structure comprising the target slot position when there is no established pre-order data structure comprising the target slot position.

5. The method according to claim 1, further comprising:
   determining whether all slot position values corresponding to slot positions comprising the updated pre-order data structure are null; and
   in a case that all slot position values corresponding to the slot positions comprising the updated pre-order data structure are null, deleting the updated pre-order data structure.

6. The method according to claim 1, further comprising:
in a case that there is a slot position with the slot position value being null in the updated pre-order data structure, outputting reply information corresponding to the slot position with the slot position value being null in the updated pre-order data structure.

7. The method according to claim 1, further comprising:
in each successive round, obtaining respective, corresponding speech information input by the user;
in each successive round, performing speech recognition on the input speech information, to obtain input information comprising the dialogue; wherein outputting the reply information, comprises:
performing text to speech conversion of the reply information, so as to obtain spoken reply information; and
outputting the spoken reply information.

8. An electronic device, comprising:
a memory storing a computer program comprising processor-executable instructions; and
a processor, configured to execute the processor-executable instructions in the memory to configure the processor to,
for each respective, successive round of a plurality of rounds of dialogue, wherein each round of dialogue includes dialogue information input by a user, determine semantic information corresponding to the dialogue information;
determine a target slot position corresponding to an item indicated by the semantic information, the item indicated by a commodity name and/or a commodity attribute;
establish a new pre-order data structure comprising the target slot position when there is no established pre-order data structure comprising the target slot position, wherein the new pre-order data structure comprises at least one slot position and at least one item that is configurable during dispensing of a commodity corresponding to the at least one slot position;
output reply information responsive to the dialogue information input by the user, wherein the reply information is configured to guide the user to input new dialogue information in a subsequent round of dialogue; and
in a case that the new dialogue information input by the user in the subsequent round of dialogue comprises a keyword indicating ordering, perform an ordering operation according to a finally-established pre-order data structure;
wherein the semantic information further comprises an operation type corresponding to the item, and the processor is configured to:
when there is an established pre-order data structure comprising the target slot position, update the target slot position comprising the established pre-order data structure according to the operation type and the item, so as to obtain an updated pre-order data structure;
wherein the processor is further configured to:
determine whether there is a slot position with a slot position value being null in the updated pre-order data structure; and
in a case that there is no slot position with the slot position value being null in the updated pre-order data structure, sequentially judge whether there is a slot position with the slot position value being null in the pre-order data structure according to an order of establishing other pre-order data structures from the most recently established to the oldest established, and in a case that it is determined that there is the slot position with the slot position value being null in any pre-order data structure, output the reply information corresponding to the slot position with the slot position value being null in the updated pre-order data structure.

9. The electronic device according to claim 8, wherein the processor is further configured to:
in a case that there is a target slot position with a slot position value being null in the new pre-order data structure, output the reply information according to the target slot position with the slot position value being null, wherein the reply information is configured to guide the user to input dialogue information for updating the slot position value of the target slot position.

10. The electronic device according to claim 8, wherein the processor is further configured to:
in a case that there is no target slot position with a slot position value being null in the established pre-order data structure, output reply information configured to guide the user to confirm ordering.

11. The electronic device according to claim 8, wherein the processor is further configured to:
in preset configuration information, determine the target slot position corresponding to the item and a slot position type of the target slot position, wherein the slot position type comprises a primary key type and a non-primary key type, wherein the primary key type is a type of a slot position corresponding to the commodity name, and the non-primary key type is a type of a slot position corresponding to the commodity attribute; and
the processor is further configured to:
in a case that the slot position type corresponding to the target slot position is the primary key type, establish a new pre-order data structure comprising the target slot position when there is no established pre-order data structure comprising the target slot position.

12. The electronic device according to claim 8, wherein the processor is configured to:
determine whether all position values corresponding to slot positions comprising the updated pre-order data structure are null; and
in a case that all the slot position values corresponding to the slot positions comprised by the updated pre-order data structure are null, delete the updated pre-order data structure.

13. The electronic device according to claim 8, wherein the processor is further configured to:
in a case that there is a slot position with the slot position value being null in the updated pre-order data structure, output reply information corresponding to the slot position with the slot position value being null in the updated pre-order data structure.

14. The electronic device according to claim 8, wherein the processor is configured to:
obtain in each round of dialogue, speech information input by the user;
in each round of dialogue, perform speech recognition on the input speech information, so as to obtain in each round of dialogue, input dialogue information;
wherein the processor is further configured to:
perform text to speech conversion of the reply information, so as to obtain spoken reply information; and
output the spoken reply information.

15. A non-transitory computer readable storage medium, storing a computer program comprising processor-executable instructions, wherein the processor-executable instructions, when executed by a processor, implement a man-machine dialogue method, the method comprising:
- for each successive, respective round of a plurality of rounds of dialogue, wherein dialogue information is input by a user in each round, determining semantic information corresponding to the dialogue information input by the user;
- determining a target slot position corresponding to an item indicated by the semantic information, the item indicated by a commodity name and/or a commodity attribute;
- establishing a new pre-order data structure comprising the target slot position when there is no established pre-order data structure comprising the target slot position, the new pre-order data structure comprises at least one slot position and at least one item that is configurable during dispensing of a commodity corresponding to the at least one slot position;
- outputting reply information responsive to the dialogue information input by the user, wherein the reply information is configured to guide the user to input new dialogue information in a succeeding round of dialogue;
- in a case that the new dialogue information input by the user in the succeeding round of dialogue comprises a keyword indicating ordering, performing an ordering operation according to a finally-established pre-order data structure;
- wherein the semantic information further comprises an operation type corresponding to the item, and the method further comprises:
- when there is an established pre-order data structure comprising the target slot position, updating the target slot position comprising the established pre-order data structure according to the operation type and the item, so as to obtain an updated pre-order data structure;
- wherein outputting the reply information responsive to the dialogue information comprises:
- determining whether there is a slot position with a slot position value being null in the updated pre-order data structure; and
- in a case that there is no slot position with the slot position value being null in the updated pre-order data structure, sequentially judging whether there is a slot position with the slot position value being null in the pre-order data structure according to an order of establishing other pre-order data structures from the most recently established to the oldest established, and in a case that it is determined that there is a slot position with the slot position value being null in any pre-order data structure, outputting the reply information corresponding to the slot position with the slot position value being null in the updated pre-order data structure.

* * * * *

UNITED STATES PATENT AND TRADEMARK OFFICE
CERTIFICATE OF CORRECTION

PATENT NO. : 12,154,554 B2
APPLICATION NO. : 17/681278
DATED : November 26, 2024
INVENTOR(S) : Zhennan Ming et al.

Page 1 of 1

It is certified that error appears in the above-identified patent and that said Letters Patent is hereby corrected as shown below:

On the Title Page

Item (72), under "Inventors", in Column 1, Line 2, delete "Bejing (CN)" and insert -- Beijing (CN) --, therefor.

In the Specification

In Column 1, Line 41, delete "where in" and insert -- wherein --, therefor.
In Column 2, Line 52, delete "on line," and insert -- online, --, therefor.
In Column 6, Line 59, delete "reminded" and insert -- reminded to --, therefor.
In Column 7, Line 48, delete "cup."," and insert -- cup.". --, therefor.
In Column 8, Line 65, delete "be" and insert -- can be --, therefor.
In Column 12, Lines 45-53, delete "speech information.........mode." and insert the same at Line 44, after "steps:", as the continuation paragraph.
In Column 13, Line 7, delete "enrich ing" and insert -- enriching --, therefor.
In Column 15, Line 3, delete "be" and insert -- been --, therefor.
In Columns 15-16, Lines 66-67 & 1-8, delete "The touch.........capability." and insert the same at Column 15, Line 65, after "panel.", as the continuation paragraph.

In the Claims

In Column 19, Line 22, in Claim 8, delete "to," and insert -- to: --, therefor.
In Column 19, Line 42, in Claim 8, delete "dialogue; and" and insert -- dialogue; --, therefor.

Signed and Sealed this
Eleventh Day of February, 2025

Coke Morgan Stewart
*Acting Director of the United States Patent and Trademark Office*